(12) United States Patent
Yu et al.

(10) Patent No.: US 9,014,733 B2
(45) Date of Patent: Apr. 21, 2015

(54) METHOD AND APPARATUS FOR BEAM ALLOCATION IN WIRELESS COMMUNICATION SYSTEM

(75) Inventors: Hyun-Kyu Yu, Yongin-si (KR); Tae-Young Kim, Seongnam-si (KR); Jeong-Ho Park, Seoul (KR); Ji-Yun Seol, Seongnam-si (KR); Su-Ryong Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 272 days.

(21) Appl. No.: 13/617,675

(22) Filed: Sep. 14, 2012

(65) Prior Publication Data

US 2013/0072243 A1    Mar. 21, 2013

(30) Foreign Application Priority Data

Sep. 16, 2011 (KR) .................. 10-2011-0093267
Sep. 14, 2012 (KR) .................. 10-2012-0102040

(51) Int. Cl.
| | |
|---|---|
| *H04B 1/00* | (2006.01) |
| *H04B 15/00* | (2006.01) |
| *H04B 17/00* | (2006.01) |
| *H04M 1/00* | (2006.01) |
| *H04B 7/06* | (2006.01) |
| *H04B 7/08* | (2006.01) |
| *H04W 72/04* | (2009.01) |

(52) U.S. Cl.
CPC .............. *H04B 7/0695* (2013.01); *H04B 7/088* (2013.01); *H04W 72/042* (2013.01); *H04W 72/046* (2013.01)

(58) Field of Classification Search
CPC ... H04B 7/0695; H04B 7/088; H04W 72/042; H04W 72/046
USPC .......................... 455/63.4, 562.1, 68–69, 513
See application file for complete search history.

(56) References Cited

U.S. PATENT DOCUMENTS

| | | | | |
|---|---|---|---|---|
| 7,792,206 | B2 * | 9/2010 | Ylitalo et al. ................. | 375/267 |
| 2007/0111760 | A1 * | 5/2007 | Hovers et al. ............... | 455/562.1 |
| 2009/0041150 | A1 * | 2/2009 | Tsai et al. ..................... | 375/267 |
| 2009/0225883 | A1 * | 9/2009 | Orlik et al. ................... | 375/260 |
| 2010/0173639 | A1 * | 7/2010 | Li et al. ......................... | 455/450 |
| 2010/0189189 | A1 * | 7/2010 | Hoshino et al. .............. | 375/267 |
| 2010/0323612 | A1 * | 12/2010 | Xu et al. ......................... | 455/7 |
| 2011/0070845 | A1 | 3/2011 | Chen et al. | |

(Continued)

FOREIGN PATENT DOCUMENTS

| | | |
|---|---|---|
| WO | 01/17131 A1 | 3/2001 |
| WO | 03/096560 A1 | 11/2003 |
| WO | 2010/024589 A2 | 3/2010 |

*Primary Examiner* — Simon Nguyen
(74) *Attorney, Agent, or Firm* — Jefferson IP Law, LLP

(57) ABSTRACT

A beam allocation method of a Base Station (BS) in a wireless communication system is provided. The method includes transmitting a reference signal to a Mobile Station (MS) using a plurality of downlink transmit (Tx) beams, receiving information of a plurality of candidate downlink Tx beams determined by the MS in response to the received reference signal, selecting at least one downlink Tx beam from the plurality of candidate downlink Tx beams according to a predefined rule, generating control information for burst transmission, comprising the selected at least one downlink Tx beam information, transmitting the control information to the MS using the selected at least one downlink Tx beam, and transmitting a data burst based on Tx beam information included in the control information.

52 Claims, 17 Drawing Sheets

(56) References Cited

U.S. PATENT DOCUMENTS

2011/0134850 A1* 6/2011 Kishigami et al. ............ 370/328
2011/0255434 A1* 10/2011 Ylitalo .......................... 370/252
2012/0027111 A1* 2/2012 Vook et al. .................... 375/267
2013/0156122 A1* 6/2013 Tsutsui et al. ................. 375/267
2013/0201944 A1* 8/2013 Kishigami et al. ............ 370/329
2014/0211731 A1* 7/2014 Inoue et al. ................... 370/329

* cited by examiner (A)

(B)

(A)

(B)

METHOD AND APPARATUS FOR BEAM ALLOCATION IN WIRELESS COMMUNICATION SYSTEM

PRIORITY

This application claims the benefit under 35 U.S.C. §119(a) of a Korean patent application filed on Sep. 16, 2011 in the Korean Intellectual Property Office and assigned Serial No. 10-2011-0093267 and a Korean patent application filed on Sep. 14, 2012 in the Korean Intellectual Property Office and assigned Serial No. 10-2012-0102040, the entire disclosure of each of which is hereby incorporated by reference.

BACKGROUND OF THE INVENTION

1. Field of the Invention

The present invention relates to a wireless communication system. More particularly, the present invention relates to a method and an apparatus for beam allocation in a wireless communication system.

2. Description of the Related Art

Wireless communication systems are advancing to support a high data rate and keep up with the continuously increasing demand for wireless data traffic.

Up to now, $4^{th}$ Generation (4G) systems mainly aim to improve spectral efficiency in order to increase a data transfer rate. However, it is hard to satisfy the continuously increasing demand for wireless data traffic merely with the spectral efficiency enhancement.

To address this issue, one method utilizes a wide frequency band. Since it is difficult to ensure the wide frequency band in the current frequency (i.e., below 10 GHz), a wider frequency band is needed.

However, as the transmission frequency for the wireless communication rises, a propagation distance is relatively shortened, thereby reducing the service coverage area. One way of addressing this issue is by implementing a beamforming technique which expands the propagation distance.

The transmit beamforming can expand a signal transmission distance and concentrates the propagation region in a specific direction using a plurality of antennas. The group of the antennas is referred to as an antenna array, and the antenna in the antenna array is referred to as an array element. Since signals are rarely transmitted in directions other than the corresponding direction, interference on other user signals can be greatly mitigated.

A receiver can carry out the receive beamforming using a receive antenna array. The receive beamforming also concentrates the propagation reception in a particular direction, thereby increasing a gain of the signal received in the corresponding direction, and excludes signals received in directions other than the corresponding direction, from the received signal which blocks interference signals.

The beamforming uses a technique for measuring/selecting transmit (Tx) and receive (Rx) beams and for feeding back the selected beam information in a base station and a mobile station. When feeding back the beam information, the base station and the mobile station can transmit information of one or more optimal beams for the sake of beam diversity and beam scheduling flexibility. In so doing, when allocating data and control resource, the base station can allocate the beam by selecting all or part of the multiple beams. Hence, for the transmit and receive beamforming of the mobile station and the base station, the base station needs to specifically provide the beam allocation information to the mobile station, or a definite beam allocation method needs to be defined in advance when the data and the control resource are allocated.

Therefore, a need exists for a method and an apparatus for efficiently allocating a Tx beam in a wireless communication system.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for efficiently allocating a transmit (Tx) beam in a wireless communication system.

In accordance with an aspect of the present invention, a beam allocation method of a Base Station (BS) in a wireless communication system is provided. The method includes transmitting a reference signal to a Mobile Station (MS) using a plurality of downlink Tx beams, receiving information of a plurality of candidate downlink Tx beams determined by the MS in response to the reception of the reference signal, selecting at least one downlink Tx beam from the plurality of candidate downlink Tx beams according to a predefined rule, generating control information for burst transmission, comprising information for the selected at least one downlink Tx beam, transmitting the control information to the MS using the selected at least one downlink Tx beam, and transmitting a data burst based on Tx beam information included in the control information.

In accordance with another aspect of the present invention, a beam allocation method of an MS in a wireless communication system is provided. The method includes receiving a reference signal, from a BS, transmitted using a plurality of downlink Tx beams, determining a plurality of candidate downlink Tx beams in response to the received reference signal, transmitting information of the determined plurality of candidate downlink Tx beams to the BS, receiving control information from the BS using a receive (Rx) beam corresponding to an optimal downlink Tx beam of one or more downlink Tx beams selected from the plurality of candidate downlink Tx beams according to a predefined rule, extracting Tx beam information, used for data burst transmission, from the control information, determining an Rx beam based on the extracted Tx beam information, and receiving a data burst from the BS using the determined Rx beam.

In accordance with another aspect of the present invention, a beam allocation apparatus of a BS in a wireless communication system is provided. The apparatus includes a transmitter configured to transmit a reference signal to an MS using a plurality of downlink Tx beams, transmit control information to the MS using at least one downlink Tx beam selected from a plurality of candidate downlink Tx beams, and transmit a data burst to the MS based on Tx beam information included in the control information, a receiver configured to receive information of the plurality of candidate downlink Tx beams determined by the MS in response to the reception of the reference signal, and a controller configured to select the at least one downlink Tx beam from the plurality of candidate downlink Tx beams according to a predefined rule, and generate the control information for burst transmission, wherein the control information comprises information for the selected candidate downlink Tx beam.

In accordance with another aspect of the present invention, a beam allocation apparatus of an MS in a wireless communication system is included. The apparatus includes a receiver configured to receive a reference signal, control information, and a data burst from a BS, the reference signal being transmitted using a plurality of downlink Tx beams, a transmitter configured to transmit information of a plurality of candidate downlink Tx beams, and a controller configured to determine the plurality of candidate downlink Tx beams in response to the received reference signal, extract Tx beam information, used for the data burst transmission, from the control information, and determine an Rx beam based on the extracted Tx beam information. The control information is received at the receiver from the BS using an Rx beam corresponding to an optimal downlink Tx beam of one or more Tx beams selected from the plurality of candidate downlink Tx beams according to a predefined rule. The data burst is received at the receiver from the BS using the determined Rx beam.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1A:
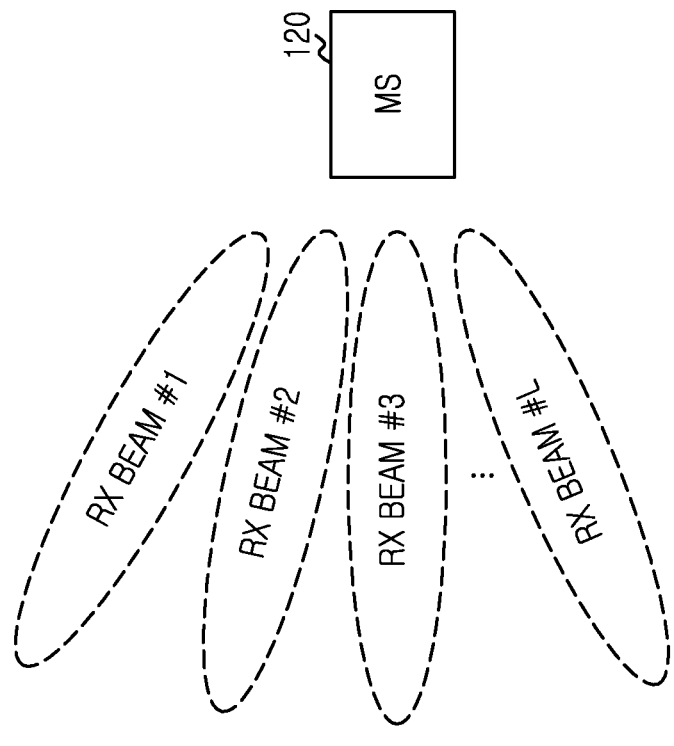
FIGS. 1A and 1B are diagrams illustrating transmit (Tx) and receive (Rx) beam patterns between a Base Station (BS) and a Mobile Station (MS) according to an exemplary embodiment of the present invention.
Figure 1A:
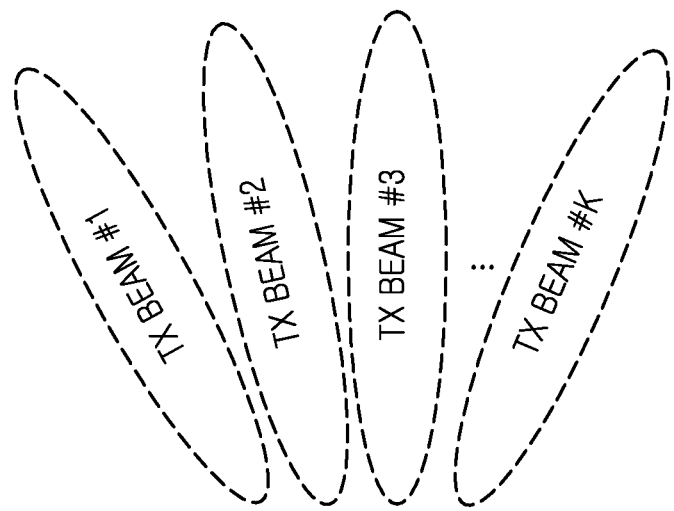

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 1 through 14, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Exemplary embodiments of the present invention provide a method and an apparatus for beam allocation in a wireless communication system. A first exemplary embodiment of the present invention (e.g., FIGS. 2 and 3) pertains to a beam allocation method when control information (hereafter, referred to as MAP) including burst (or packet) allocation information is transmitted. In this case, the MAP corresponds to a downlink signal. A second exemplary embodiment of the present invention (e.g., FIGS. 4 and 5) pertains to a beam allocation method when a burst allocated by the MAP is transmitted. In this case, the burst includes both of uplink and downlink signals. A third exemplary embodiment of the present invention (e.g., FIGS. 6 and 7) pertains to a beam allocation method when the MAP and the burst allocated by the MAP are transmitted.

Hereafter, in the downlink signal, a Base Station (BS) receives one or more downlink optimal (P) transmit (Tx) beam information fed back from a Mobile Station (MS) in all of the three exemplary embodiments of the present invention. In the uplink signal, the BS estimates and obtains one or more uplink optimal (Q) Tx beams in the second and third exemplary embodiments of the present invention. Herein, the downlink and the uplink signals imply that one MS communicates with one BS (i.e., a sector or a Remote Radio Head (RRH)) and with one or more BSs (i.e., sectors or the RRHs).

Figure 1B:
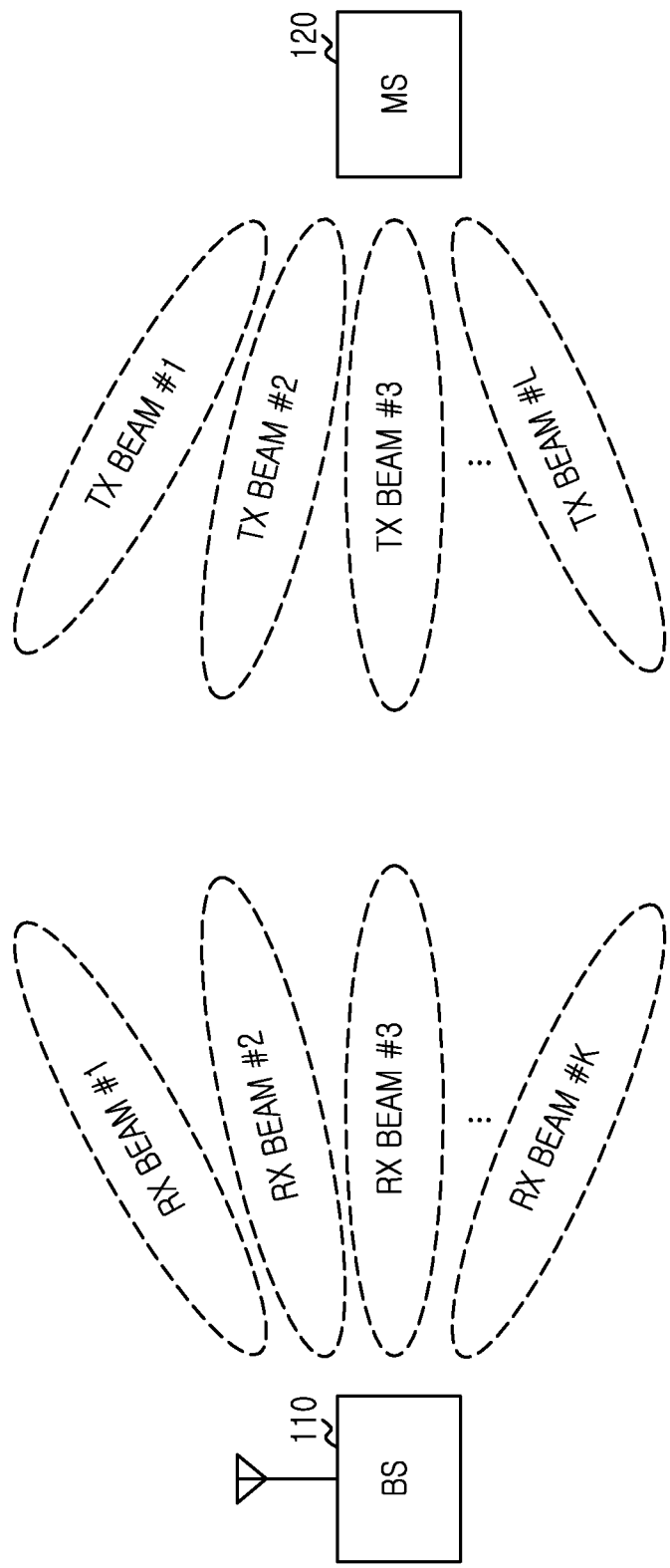
Figure 1C:
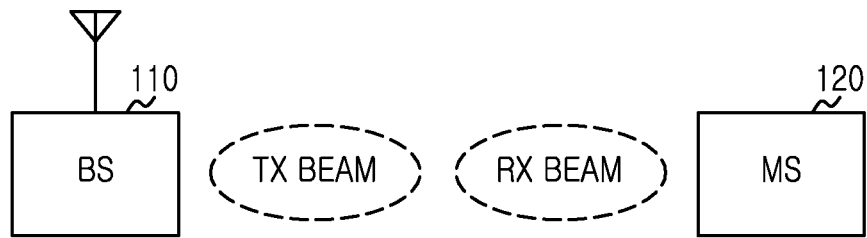
FIG. 1C is a diagram illustrating operations for transmitting and receiving a downlink reference signal between a BS and an MS according to an exemplary embodiment of the present invention.
Figure 1C:
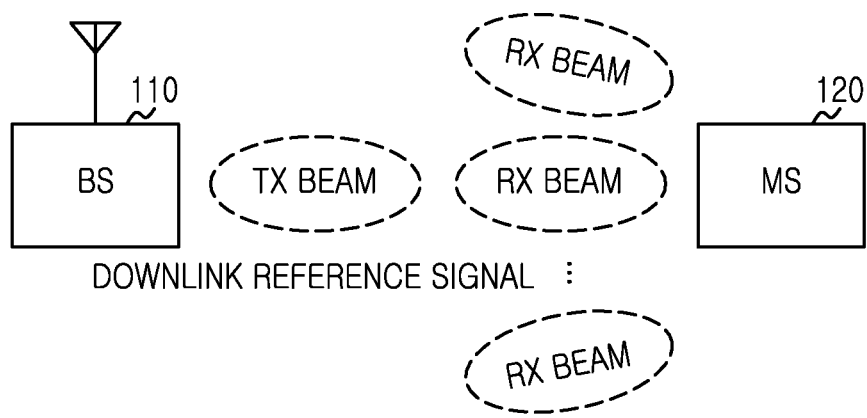
Figure 1D:
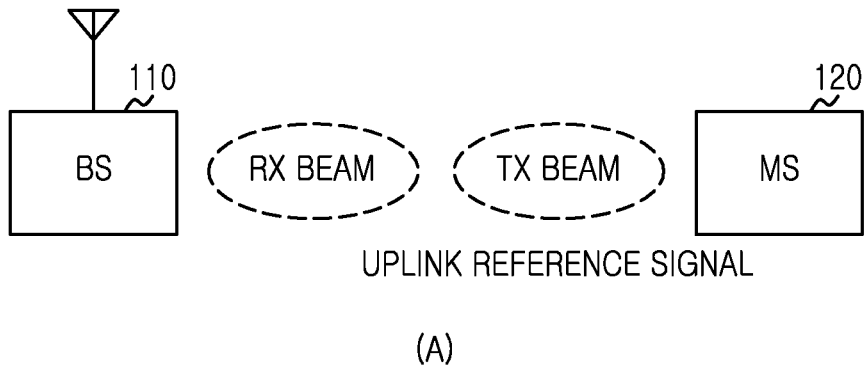
FIG. 1D is a diagram illustrating operations for transmitting and receiving an uplink reference signal between a BS and an MS according to an exemplary embodiment of the present invention.
Figure 1D:
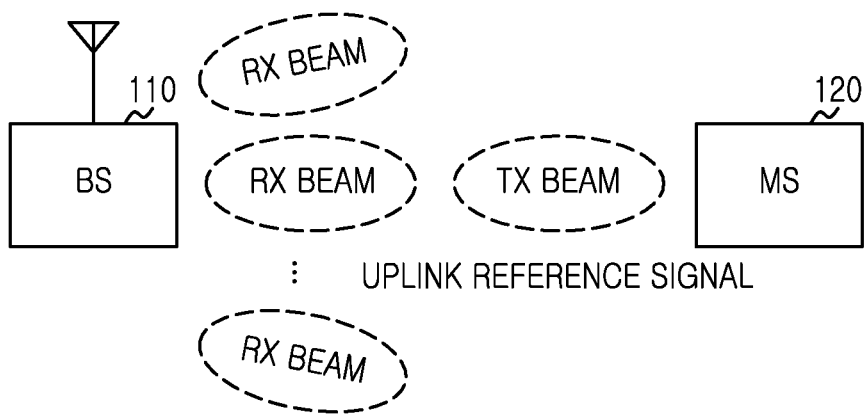

FIGS. 1A and 1B are diagrams illustrating Tx and Rx beam patterns between a BS and an MS according to an exemplary embodiment of the present invention. FIG. 1C is a diagram illustrating operations for transmitting and receiving a downlink reference signal between a BS and an MS according to an exemplary embodiment of the present invention. FIG. 1D is a diagram illustrating operations for transmitting and receiving an uplink reference signal between a BS and an MS according to an exemplary embodiment of the present invention.

Referring to FIG. 1A, when a BS 110 can generate K Tx beam patterns and an MS 120 can generate L receive (Rx) beam patterns, the BS 110 transmits N (=K*L) downlink reference signals to the MS 120 during a specific time interval so that the MS 120 can determine an optimal downlink Tx beam pattern and an optimal downlink Rx beam pattern. Herein, it is assumed that the MS 120 can receive one downlink reference signal by generating only one Rx beam pattern (i.e., (A) in FIG. 1C). In various exemplary implementations, the MS 120 can receive one downlink reference signal by generating a plurality of Rx beam patterns at the same time (i.e., (B) in FIG. 1C). For example, the number of the downlink reference signals needed for determining the downlink Tx and Rx beam patterns can vary according to the exemplary implementation of the MS 120.

Referring to FIG. 1B, when the MS 120 can generate L Tx beam patterns and the BS 110 can generate K Rx beam patterns, the MS 120 transmits N (=K*L) uplink reference signals to the BS 110 during a specific time interval so that the BS 110 can determine an optimal uplink Tx beam pattern and an optimal uplink Rx beam pattern. Herein, it is assumed that the BS 110 can receive one uplink reference signal by generating only one Rx beam pattern (i.e., (A) in FIG. 1D). In various exemplary implementations, the BS 110 can receive one uplink reference signal by generating a plurality of Rx beam patterns at the same time (i.e., (B) in FIG. 1D). For example, the number of the uplink reference signals needed for determining the uplink Tx and Rx beam patterns can vary according to the exemplary implementation of the BS.

Figure 2:
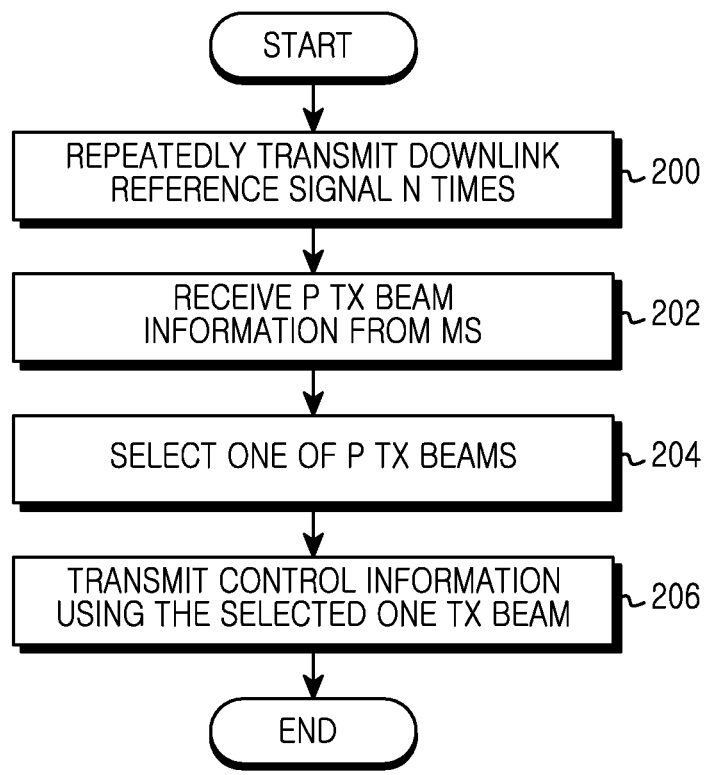
FIG. 2 is a flowchart illustrating a beam allocation method of a BS according to an exemplary embodiment of the present invention.

FIG. 2 is a flowchart illustrating a beam allocation method of a BS according to an exemplary embodiment of the present invention. Herein, the BS allocates the Tx beam in an initial MAP transmission.

Referring to FIG. 2, the BS repeatedly transmits the downlink reference signal N (=K*L) times as shown in FIG. 1A in step 200, and receives P (herein, P is an integer greater than 1 and smaller than or equal to K) candidate downlink Tx beam information from the MS in step 202. Steps 200 and 202 are not needed in every MAP transmission, and can be performed on a periodic basis or at a particular time.

In step 204, the BS selects at least one optimal Tx beam from the P candidate downlink Tx beams. A rule for the BS to select the Tx beam should be agreed in advance between the MS and the BS. For example, the rule can be notified to the MS over a broadcasting channel. According to the rule, the BS selects the optimal Tx beam based on a signal strength of the reference signal among the P Tx beams fed back from the MS. For example, the BS selects the optimal Tx beam based on a Received Signal Strength Indication (RSSI), a Carrier to Interference and Noise Ratio (CINR), and a Signal to Interference Ratio (SIR) of the reference signal.

Figure 9:
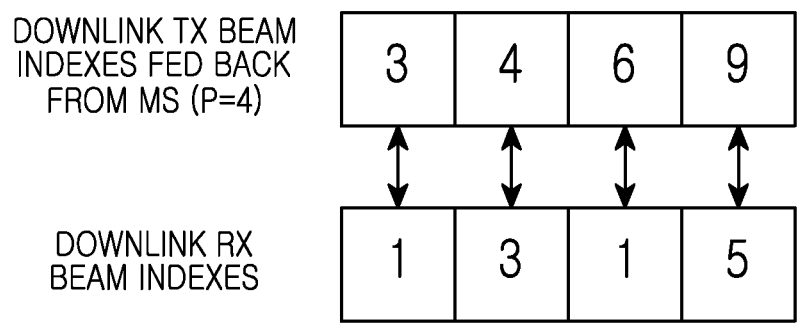
FIG. 9 is a diagram illustrating pairs of optimal downlink Tx beam and Rx beam selected in a beam allocation according to an exemplary embodiment of the present invention.

FIG. 9 is a diagram illustrating pairs of optimal downlink Tx beam and Rx beam selected in a beam allocation according to an exemplary embodiment of the present invention.

For example, when the BS 110 transmits the (K*L) downlink reference signals to the MS 120 as shown in FIG. 1A, the MS 120 measures the RSSI, the CINR, or the SIR of the received (K*L) downlink reference signals, and selects and transmits the P Tx/Rx beam pairs to the BS.

Referring to FIG. 9, P=4 (Tx beam index: 3, 4, 6, 9) and the optimal Tx beam is, for example, 3. The Tx beam 3 corresponds to the optimal Rx beam 1, the Tx beam 4 corresponds to the optimal Rx beam 3, the Tx beam 6 corresponds to the optimal Rx beam 1, and Tx beam 9 corresponds to the optimal Rx beam 5. The optimal Rx beam corresponding to the optimal Tx beam can vary per Tx beam, and the BS can select either the Tx beam 3 or the Tx beam 6 for the MAP transmission.

Figure 8:
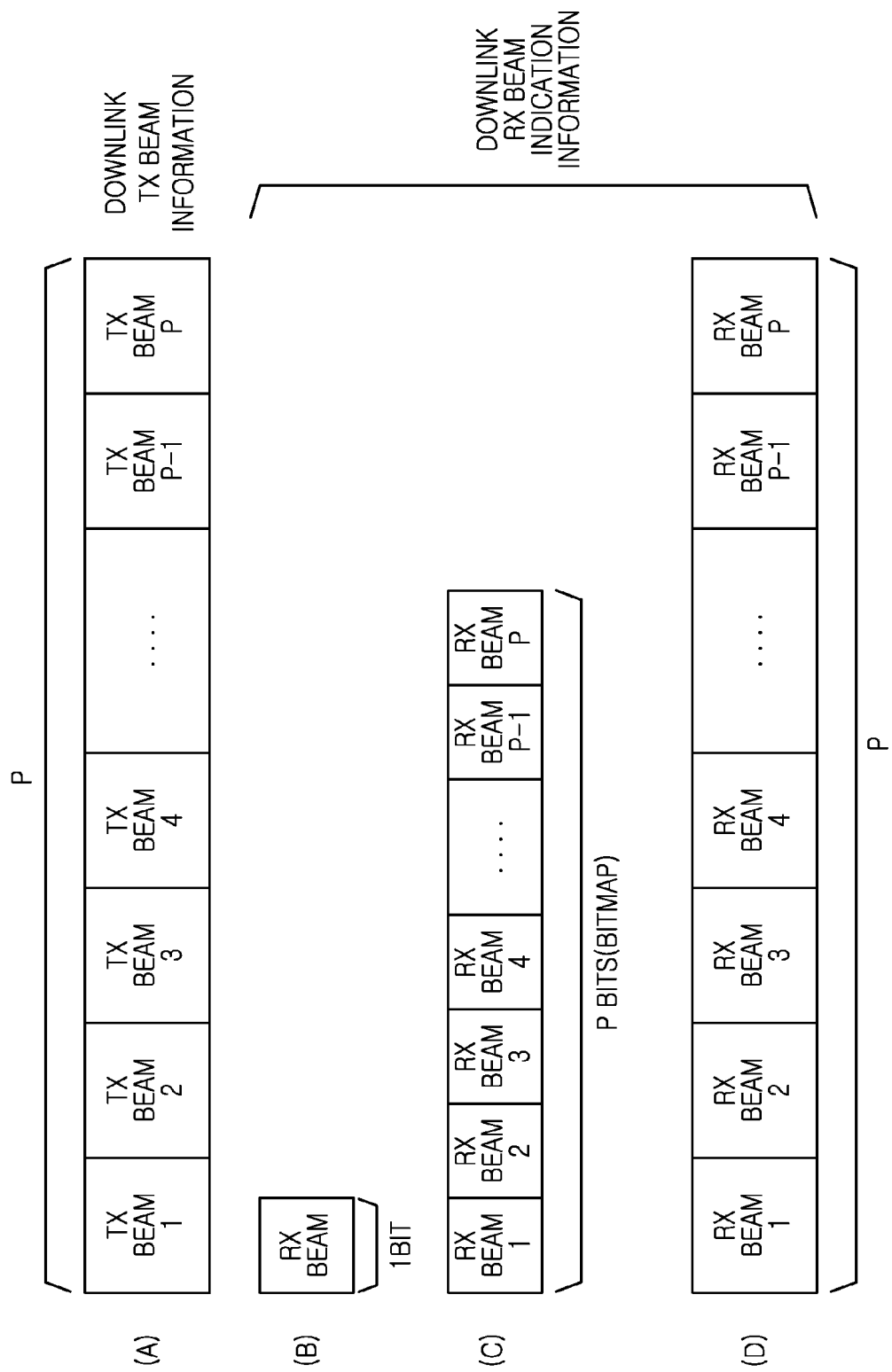
FIG. 8 is a diagram illustrating structures of downlink Tx beam information and Rx beam indication information according to an exemplary embodiment of the present invention.

FIG. 8 is a diagram illustrating structures of downlink Tx beam information and Rx beam indication information according to an exemplary embodiment of the present invention.

Figure 6:
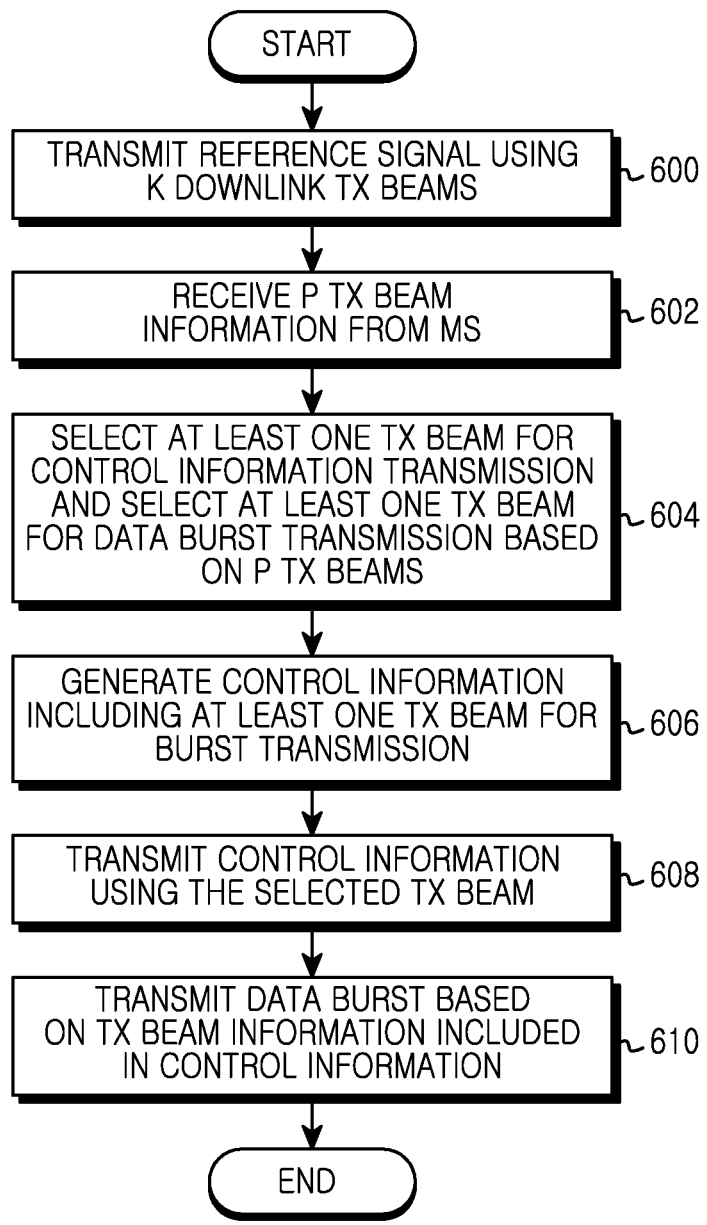
FIG. 6 is a flowchart illustrating a beam allocation method of a BS according to an exemplary embodiment of the present invention.

Referring to FIG. 8, when the MS does not transmit the corresponding optimal Rx beam information as feeding the P candidate downlink Tx beam information back to the BS (i.e., (A) in FIG. 8), the BS selects the optimal Tx beam (e.g., the Tx beam index 3 in FIG. 6).

Alternatively, when the MS feeds the P downlink optimal Tx beam information back to the BS (i.e., (A) in FIG. 8), the following indication information (exemplified in (B), (C), and (D) of FIG. 8) can be transmitted together. In this case, the BS may select a particular Tx beam (e.g., the Tx beam index 6) of which the corresponding optimal Rx beam is the same as the optimal Rx beam (e.g., the Rx beam index 1) corresponding to the optimal Tx beam (e.g., the Tx beam index 3) among the P downlink Tx beams fed back.

Referring to (B) of FIG. 8, the indication information can be 1-bit information relating to whether all of the P candidate downlink Tx beams correspond to the single downlink optimal Rx beam.

Referring to (C) of FIG. 8, the indication information is P-bit bitmap information, and each bit indicates whether the optimal Rx beam corresponding to the downlink optimal Tx beam fed back is the same as the optimal Rx beam corresponding to the optimal downlink Tx beam.

Referring to (D) of FIG. 8, the indication information indicates every optimal Rx beam index information corresponding to the candidate downlink Tx beam fed back.

Referring back to FIG. 2, in step 206, the BS transmits control information (e.g., MAP information) for the burst allocation to the MS using the selected one Tx beam pattern. Alternatively, when the optimal Tx beam 3 corresponds to the Rx beam 1 and the Rx beam 1 corresponds to the Tx beam 6, as shown in FIG. 9, the BS can transmit the MAP information using the two Tx beams (i.e., the Tx beam 3 and the Tx beam 6). Alternatively, the BS can transmit the MAP information using the P downlink Tx beams.

The beam allocation method of the BS of FIG. 2 can be limited to the MS supporting the receive beamforming. For example, the BS and the MS may negotiate the Receive beamforming capability of the MS in advance, and the above allocation rule can be applied only to the MS supporting the Receive beamforming. The BS can arbitrarily select the beam for the MAP transmission based on the P Tx beams fed back from the MS not supporting the Receive beamforming. Upon identifying two or more receive Radio Frequency (RF) chains of the MS through the negotiation, the BS can apply the above-stated method by expanding to the corresponding number.

When the BS can select one of a plurality of Tx beam widths in the MAP transmission, it selects the Tx beam width of the MAP according to a predefined rule, for example, according to the transmission with the Tx beam of the widest beam width or with the Tx beam of the narrowest beam width.

Figure 3:
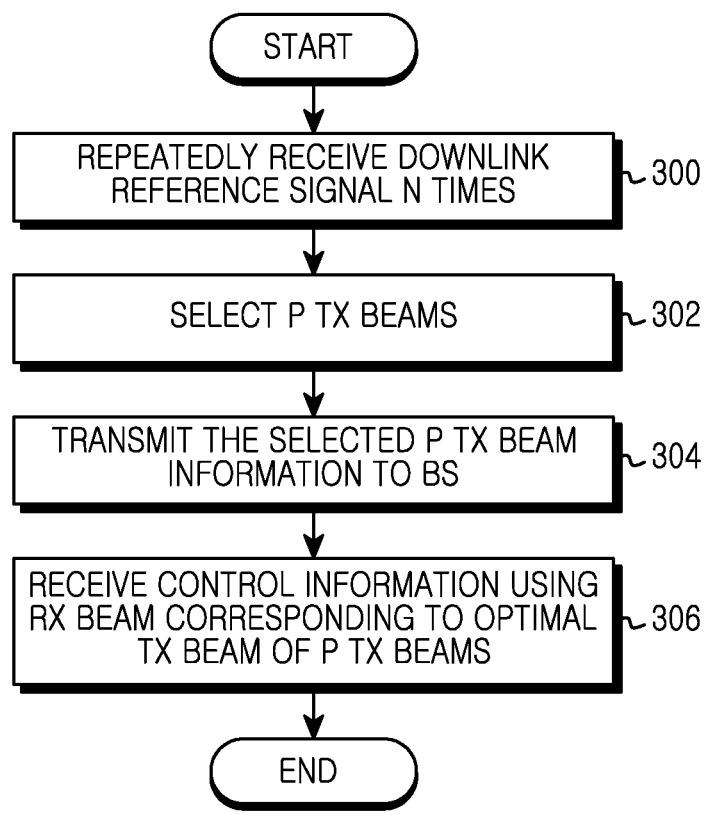
FIG. 3 is a flowchart illustrating a beam allocation method of an MS according to an exemplary embodiment of the present invention.

FIG. 3 is a flowchart illustrating a beam allocation method of an MS according to an exemplary embodiment of the present invention. Herein, the MS, upon receiving the initial MAP, allocates the Rx beam.

Referring to FIG. 3, the MS repeatedly receives the reference signal N (=K*L) times over the K particular Tx beams in step 300, and selects P candidate Tx and Rx beams based on the RSSI, the CINR, or the SIR of the received reference signal exceeding a particular threshold in step 302. In various exemplary implementations, the MS can arrange the Tx/Rx beam pairs based on the RSSI, the CINR, or the SIR of the reference signal, and select the Tx/Rx beam pairs as many as a predefined number. In some exemplary implementations, the MS can select P Tx beams and select a plurality of optimal Rx beams corresponding to the Tx beams. In various exemplary implementations, the MS can select the optimal Tx/Rx beam pair based on the RSSI, the CINR, or the SIR of the reference signal and select (P−1) optimal Tx beams corresponding to the Rx beams. In step 304, the MS transmits the selected P Tx/Rx beam pairs or Tx beam information to the BS. In various exemplary implementations, the MS can transmit the P candidate downlink Tx beam information (A) together with indication information (B) indicating whether all of the P candidate downlink Tx beams correspond to the single downlink Rx beam, information (C) indicating whether the optimal Rx beam corresponding to the optimal Tx beam is the same as the Rx beam corresponding to the optimal downlink Tx beam, or every Rx beam index information (D) corresponding to the candidate downlink Tx beam fed back as shown in FIG. 8.

In step 306, the MS receives the MAP information from the BS using the Rx beam corresponding to the optimal Tx beams among the P Tx beams. Thereafter, the MS completes this process.

Steps 300 through 304 are not needed in every MAP reception, and can be carried out on a periodic basis or at a particular time.

Figure 4:
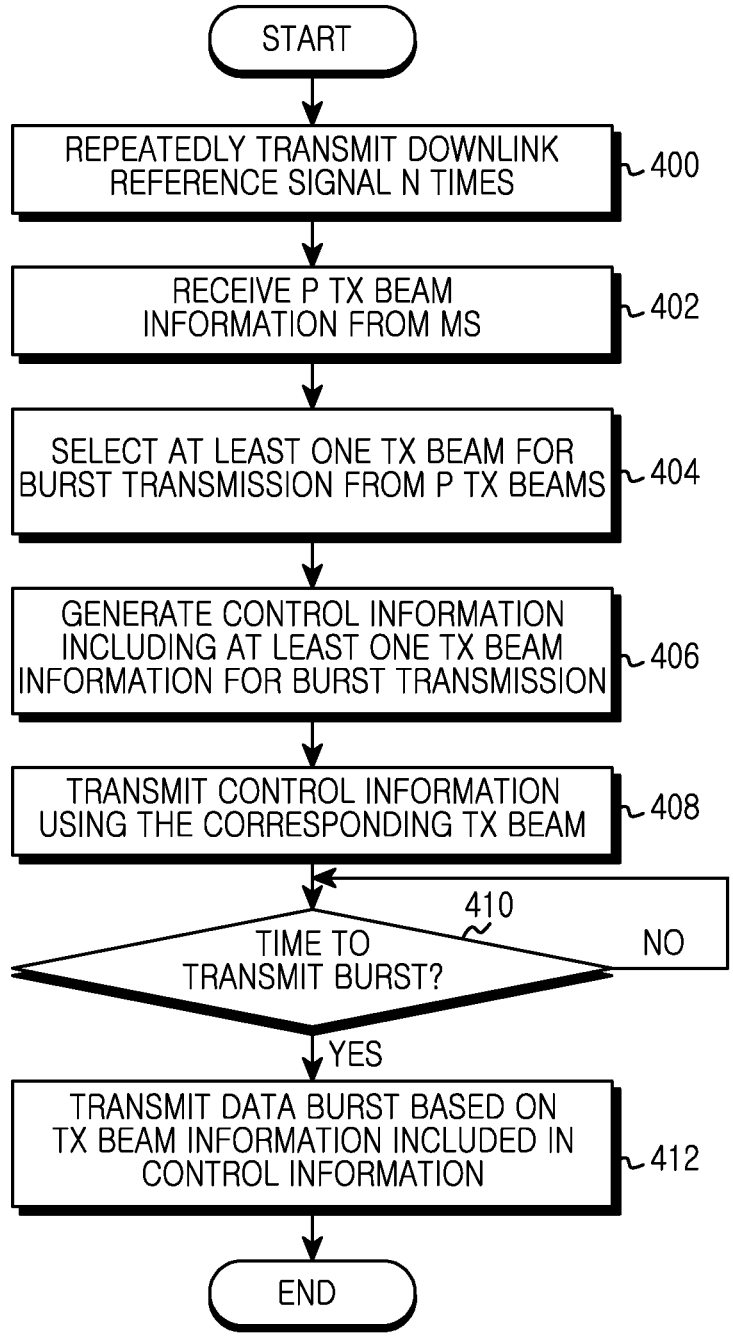
FIG. 4 is a flowchart illustrating a beam allocation method of a BS according to an exemplary embodiment of the present invention.

FIG. 4 is a flowchart illustrating a beam allocation method of a BS according to an exemplary embodiment of the present invention. Herein, the BS allocates the Tx beam when transmitting the burst allocated by the MAP.

Referring to FIG. 4, in step 400, the BS repeatedly transmits the downlink reference signal N (=K*L) times, as shown in FIG. 1A, and receives P candidate downlink Tx beam information from the MS in step 402. Steps 400 and 402 are not needed in every MAP transmission, and can be performed on a periodic basis or at a particular time.

In step 404, the BS selects at least one Tx beam for the burst transmission from the P Tx beams.

The BS generates control information (e.g., MAP) including at least one Tx beam information for the burst transmission in step 406, and transmits the control information using the selected Tx beam, as stated in FIG. 2, in step 408.

Figure 10:
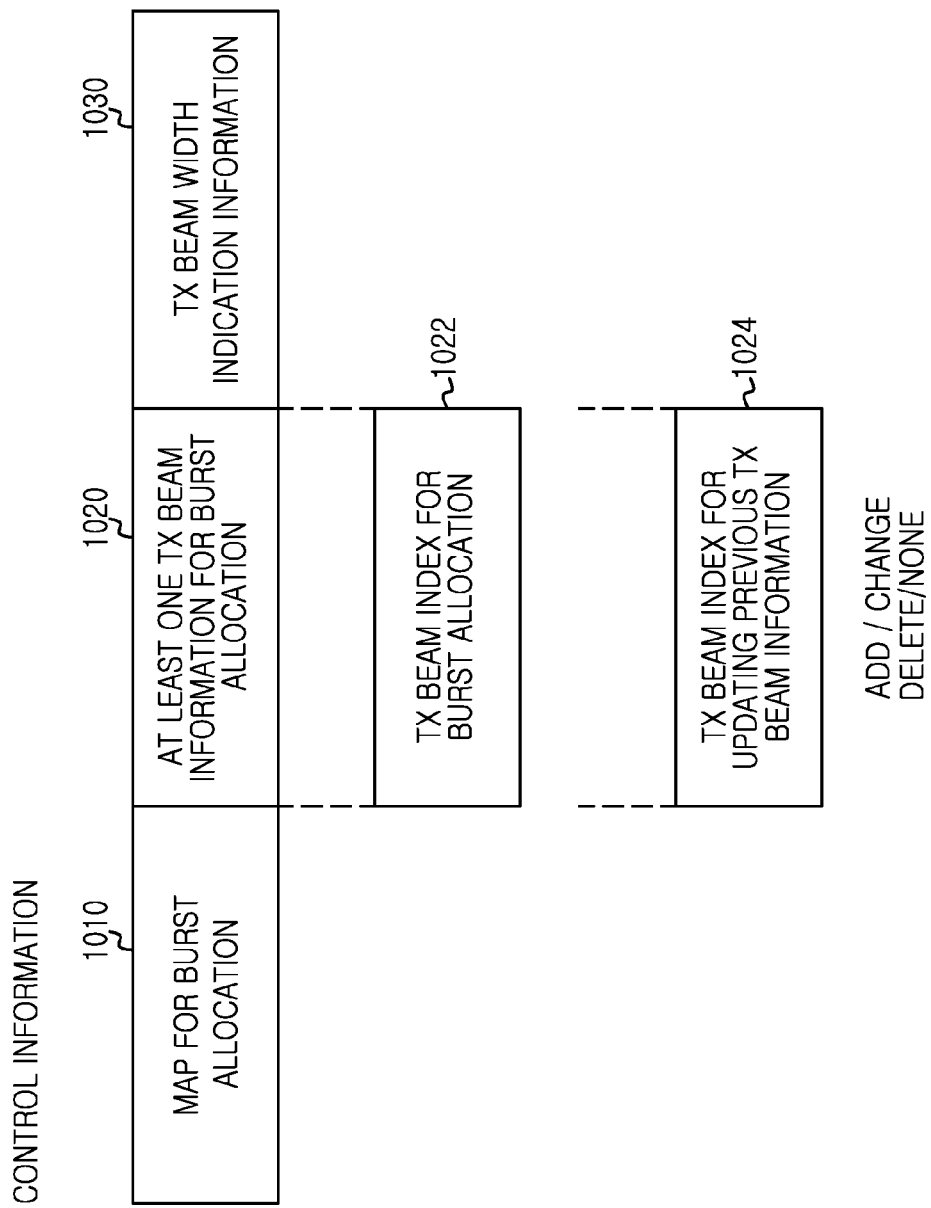
FIG. 10 is a diagram illustrating a control information structure according to an exemplary embodiment of the present invention.

FIG. 10 is a diagram illustrating a control information structure according to an exemplary embodiment of the present invention.

Referring to FIG. 10, the control information can include the MAP 1010 for the burst allocation and the at least one Tx beam information 1020 for the burst transmission. In various exemplary implementations, the Tx beam information 1020 can include at least one Tx beam index 1022 for the burst transmission.

In various exemplary implementations, the Tx beam information 1020 can include information for updating previous Tx beam information 1024. For example, the Tx beam information 1020 can include Tx beam add, Tx beam delete, Tx beam change, or none (e.g., no Tx beam index information) with respect to the Tx beam used in the previous burst transmission.

In step 410, the BS determines whether it is time to transmit the burst allocated to the MAP information. When it is time to transmit the burst, the BS proceeds to step 412. Otherwise, the BS repeats step 410 until it is determined that it is time to transmit the burst.

In step 412, the BS transmits the data burst based on the Tx beam information included in the control information. The Tx beam information in the control information can be the Tx beam index selected for the burst transmission based on the P Tx beams, or the Tx beam index for updating the previous Tx beam information using the following functions:

Tx beam ADD function: transmits the burst by using the Tx beam of the current control information in addition to the Tx beam used to transmit the previous burst in Hybrid Automatic Repeat reQuest (HARQ) retransmission. The ADD function is requisite in an initial HARQ transmission, which has no previous HARQ transmission.

Tx beam CHANGE function: transmits the burst by changing one or more of the Tx beams used to transmit the previous burst, with the Tx beam of the current control information in the HARQ retransmission.

Tx beam DELETE function: transmits the burst by deleting one or more of the Tx beams used to transmit the previous burst in the HARQ retransmission.

NONE: transmits the burst using the Tx beam used to transmit the previous burst in the HARQ retransmission.

The Tx beam information in the MAP can be signaled using the following (three) exemplary methods.

The exemplary signaling method of step 408 executes only an instruction for one Tx beam in one burst allocation (including the HARQ retransmission). For example, the ADD, CHANGE, and NONE are applied only to one Tx beam, and thus the MAP carries only one Tx beam index. The Tx beam index may be the corresponding index transmitted in the feedback. Signaling overhead can be reduced by generating a new index in the Tx beam which is fed back.

Alternatively, the exemplary method executes an instruction for one or more Tx beams in one burst allocation (including the HARQ retransmission). For example, the ADD, CHANGE, DELETE, and NONE are applied to the plurality of Tx beams, and thus the MAP carries the Tx beam indexes and bits relating to the function information of the beam indexes.

Alternatively, the exemplary method executes an instruction for every Tx beam fed back in one burst allocation (including the HARQ retransmission). For example, the Tx beam to be used to transmit the burst can be notified using an on/off signal by setting the bitmap of every Tx beam fed back. This method can perform any one of the ADD, CHANGE, DELETE, and NONE functions. Thereafter, the BS completes this process.

The exemplary beam allocation method of the BS for the data burst as stated in FIG. 4 can be limited to the Receive beamforming of the MS. For example, the BS and the MS can negotiate the Receive beamforming capability of the MS in advance, and the MAP can carry the signaling information only for the MS supporting the Receive beamforming. The BS may not transmit the Tx beam information in the MAP for the MS not supporting the Receive beamforming.

When the BS can select one of the plurality of Tx beam widths in the data transmission, the MAP can additionally carry the information 1030 (FIG. 10) about which Tx beam width is selected.

Figure 5:
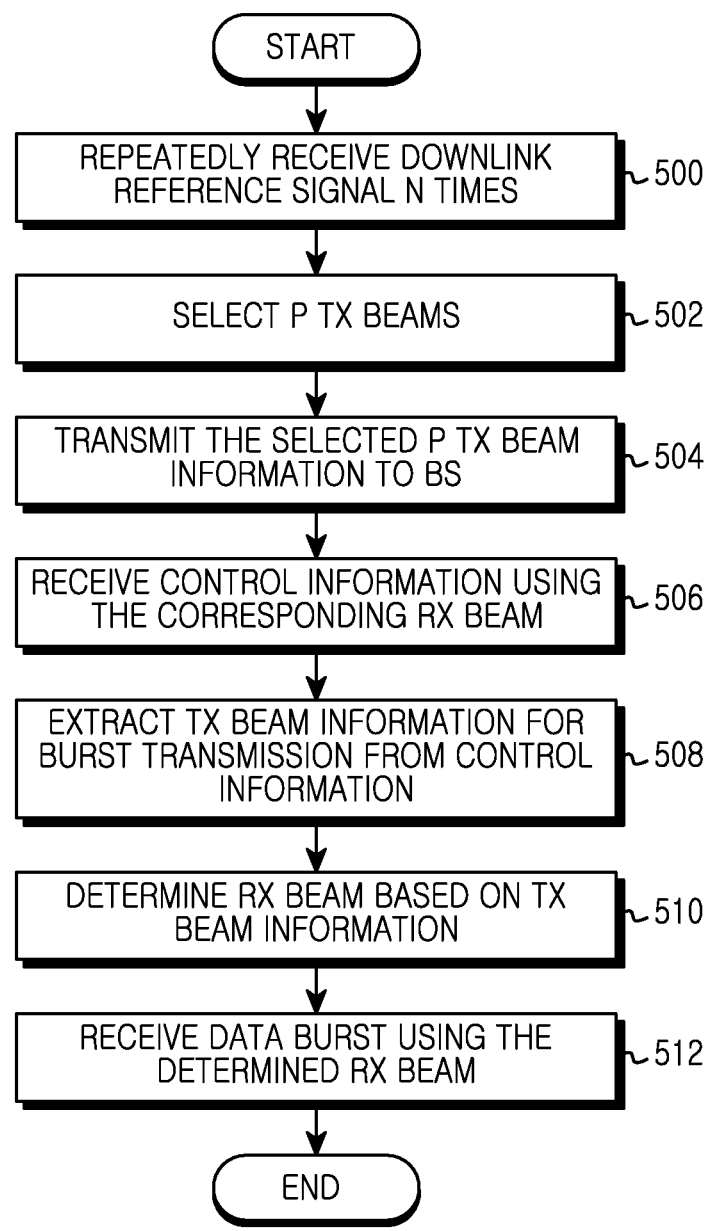
FIG. 5 is a flowchart illustrating a beam allocation method of an MS according to an exemplary embodiment of the present invention.

FIG. 5 is a flowchart illustrating a beam allocation method of an MS according to an exemplary embodiment of the present invention. Herein, the MS, upon receiving the burst allocated by the MAP, allocates the Rx beam.

Referring to FIG. 5, the MS repeatedly receives the reference signal N (=K*L) times over the K particular Tx beams in step 500, and selects P candidate Tx and Rx beams based on the RSSI, the CINR, or the SIR of the received reference signal exceeding a particular threshold in step 502.

In step 504, the MS transmits the selected P Tx/Rx beam pairs or the Tx beam information to the BS.

In step 506, the MS receives the control information (e.g., MAP) for the burst allocation by selecting the Rx beam as shown in FIG. 3.

Thereafter, the MS extracts the Tx beam information for the burst transmission from the control information in step 508. In step 510, the MS determines the Tx beam for the burst transmission and identifies the Rx beam corresponding to the determined Tx beam. For example, the MS can identify the Rx beam corresponding to the Tx beam based on the Tx/Rx beam pair.

In step 512, the MS receives the burst data at the burst transmission time using the determined Rx beam. Thereafter, the MS completes this process.

FIG. 6 is a flowchart illustrating a beam allocation method of a BS according to an exemplary embodiment of the present invention. Herein, as transmitting the MAP and the burst allocated by the MAP, the BS allocates the Tx beam.

Referring to FIG. 6, the BS transmits the K downlink reference signals in step 600, and receives P candidate downlink Tx beam information from the MS in step 602. Steps 600 and 602 are not needed in every MAP transmission or every data burst transmission, and can be performed on a periodic basis or at a particular time.

In step 604, the BS selects at least one Tx beam for the control information transmission and at least one Tx beam for the data burst transmission based on the P Tx beams.

The BS generates control information (e.g., MAP) including the at least one Tx beam information for the burst transmission in step 606. The control information can include the MAP 1010 (FIG. 10) for the burst allocation and the at least one Tx beam information 1020 for the burst transmission as shown in FIG. 10. In various exemplary implementations, the Tx beam information 1020 can include at least one Tx beam index 1022 for the burst transmission. In various exemplary implementations, the Tx beam information 1020 can include the information for updating the previous Tx beam information 1024. For example, the Tx beam information 1020 can include the Tx beam add, the Tx beam delete, the Tx beam change, or none (e.g., no Tx beam index information) with respect to the Tx beam used in the previous burst transmission.

The BS transmits the control information using the selected Tx beam in step 608. The Tx beam information in the MAP can be signaled in step 608 using the following (three) exemplary methods. In a first example, the signaling method executes only the instruction for one Tx beam in one burst allocation (including the HARQ retransmission). In a second example, the method executes the instruction for one or more Tx beams in one burst allocation (including the HARQ retransmission). In a third example, the method executes the instruction for every Tx beam fed back in one burst allocation (including the HARQ retransmission).

In step 610, the BS transmits the data burst based on the Tx beam information included in the control information. The Tx beam information in the control information can be the Tx beam index selected for the burst transmission based on the P Tx beams, or the Tx beam index for updating the previous Tx beam information.

The exemplary beam allocation method of the BS for the data burst, as stated in FIG. 6, can be limited to the Receive beamforming of the MS. For example, the BS and the MS can negotiate the Receive beamforming capability of the MS in advance, and the MAP can carry the signaling information only for the MS supporting the Receive beamforming. The BS may not transmit the Tx beam information in the MAP for the MS not supporting the Receive beamforming.

When the BS can select one of the plurality of Tx beam widths in the data transmission, the MAP can additionally carry the information 1030 (FIG. 10) about which Tx beam width is selected.

Figure 7:
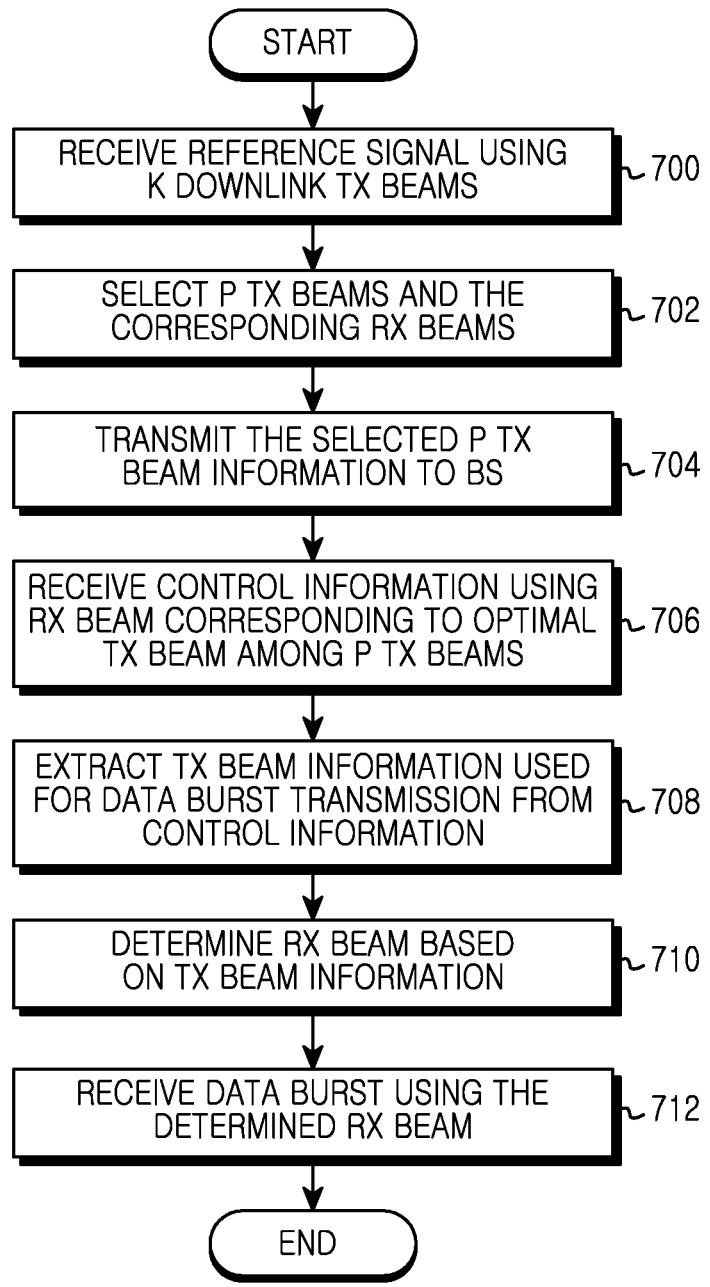
FIG. 7 is a flowchart illustrating a beam allocation method of an MS according to an exemplary embodiment of the present invention.

FIG. 7 is a flowchart illustrating a beam allocation method of an MS according to an exemplary embodiment of the present invention. Herein, when receiving the MAP and the burst allocated by the MAP, the MS allocates the Rx beam.

Referring to FIG. 7, the MS receives the reference signal using the K downlink Tx beams in step 700, and selects P candidate Tx beams and their corresponding Rx beams based on the RSSI, the CINR, or the SIR of the received reference signal exceeding a particular threshold in step 702. In step 704, the MS transmits the selected P Tx beam information to the BS. In step 706, the MS receives the control information (e.g., MAP) using the Rx beam corresponding to the optimal Tx beam among the P Tx beams. Thereafter, the MS extracts the Tx beam information used for the burst transmission from the control information in step 708, and determines the Rx beam based on the Tx beam information in step 710. In step 712, the MS receives the burst data using the determined Rx beam.

Figure 11:
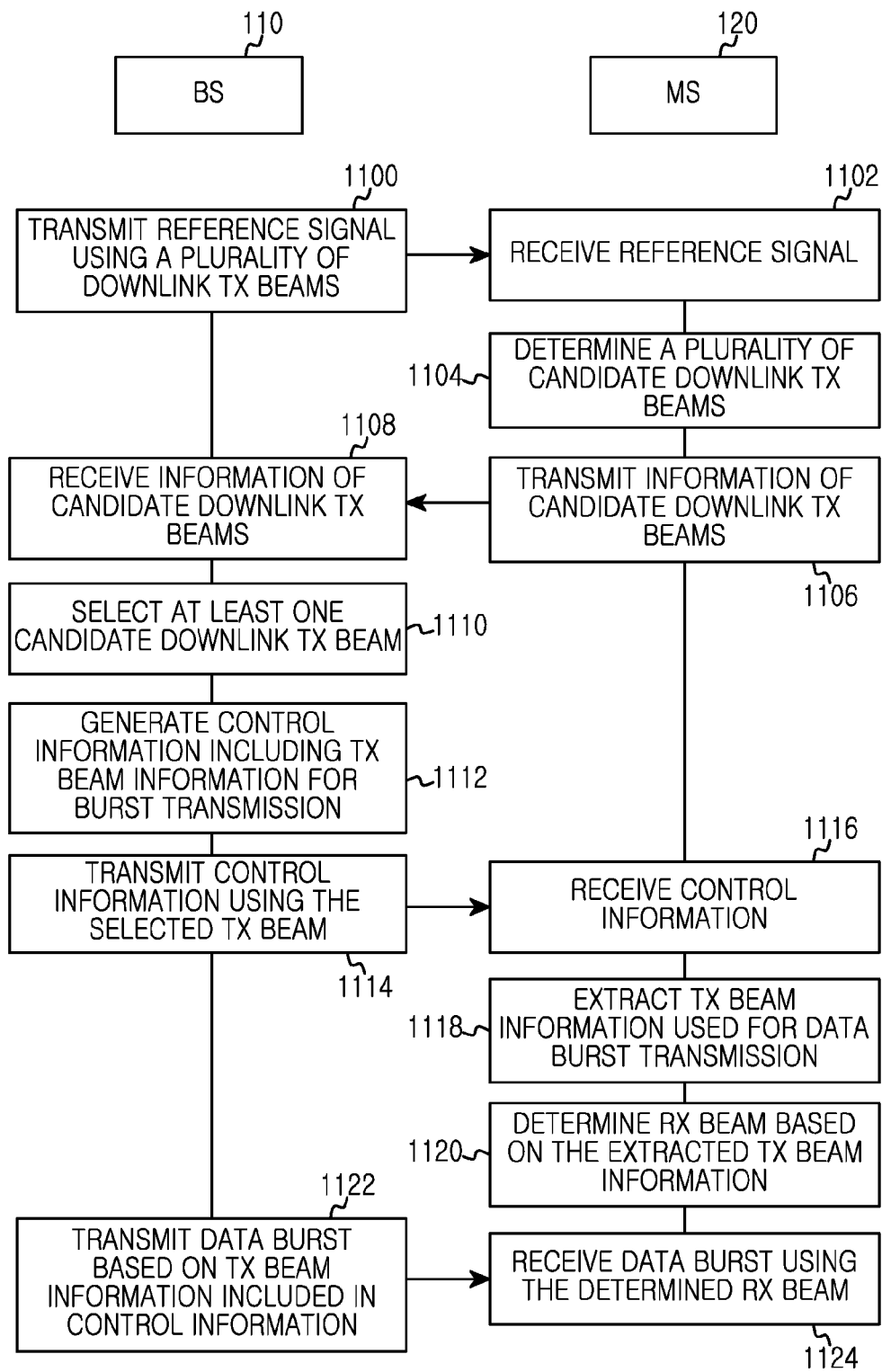
FIG. 11 is a diagram illustrating a beam allocation between a BS and an MS according to an exemplary embodiment of the present invention.

FIG. 11 is a diagram illustrating a beam allocation between a BS and an MS according to an exemplary embodiment of the present invention.

Referring to FIG. 11, the MS 120 determines the plurality of the candidate downlink Tx beams based on the reference signal received from the BS 110, and transmits only the information of the determined candidate downlink Tx beams to the BS 110. The BS 110 allocates the Tx beam when transmitting the MAP and the burst allocated by the MAP, and the MS 120 allocates the Rx beam when receiving the MAP and the burst allocated by the MAP.

In step 1100 of FIG. 11, the BS 110 transmits the reference signal to the MS 120 using the plurality of downlink Tx beams.

In step 1102, the MS 120 receives the reference signal from the BS 110 using the plurality of downlink Tx beams. In step 1104, the MS 120 determines the plurality of the candidate downlink Tx beams in response to the received reference signal. In step 1106, the MS 120 transmits the information of the determined candidate downlink Tx beams to the BS 110. The number of the candidate downlink Tx beams can be determined to be a value greater than 1 and smaller than or equal to the number of the downlink Tx beams.

In step 1108, the BS 110 receives the information of the plurality of candidate downlink Tx beams determined by the MS 120 in response to the reference signal reception. In step 1110, the BS 110 selects at least one downlink Tx beam from the candidate downlink Tx beams according to a predefined rule, which is notified to the MS 120 in advance over a broadcasting channel. For example, the predefined rule selects at least one downlink Tx beam from the candidate downlink Tx beams based on the signal strength.

In step 1112, the BS 110 generates the control information including the Tx beam information for the burst transmission. In step 1114, the BS 110 transmits the control information using the selected Tx beam. The number of the selected Tx beams is determined to be a value greater than 1 and smaller than or equal to the number of the candidate downlink Tx beams. For example, the control information can include the MAP information for the burst allocation, at least one Tx beam index for the data burst transmission, and the information for updating the Tx beam information of the previous control information.

In step 1116, the MS 120 receives the control information from the BS 110 using the Rx beam corresponding to the optimal downlink Tx beam of the Tx beams selected according to the predefined rule from the candidate downlink Tx beams. In step 1118, the MS 120 extracts the Tx beam information used for the data burst transmission, from the control information. In step 1120, the MS 120 determines the Rx beam based on the extracted Tx beam information.

In step 1122, the BS 110 transmits the data burst based on the Tx beam information included in the control information.

In step 1124, the MS 120 receives the data burst from the BS 110 using the determined Rx beam.

Figure 12:
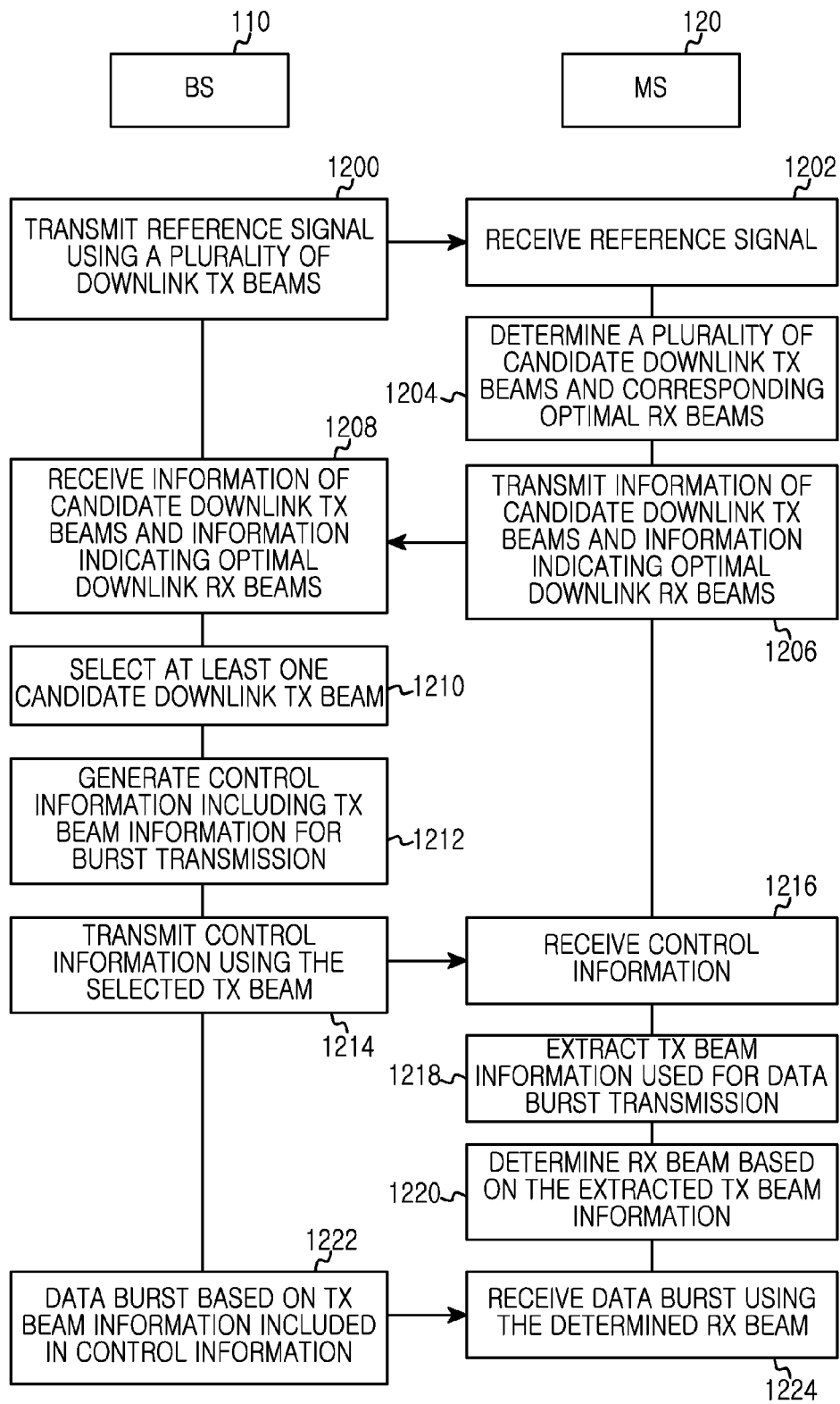
FIG. 12 is a diagram illustrating a beam allocation between a BS and an MS according to an exemplary embodiment of the present invention.

FIG. 12 is a diagram illustrating a beam allocation between a BS and an MS according to an exemplary embodiment of the present invention.

Referring to FIG. 12, the MS 120 determines the plurality of the candidate downlink Tx beams based on the reference signal received from the BS 110, and transmits the information of the determined candidate downlink Tx beams and the information of the corresponding downlink Rx beams to the BS 110. The BS 110 allocates the Tx beam when transmitting the MAP and the burst allocated by the MAP, and the MS 120 allocates the Rx beam when receiving the MAP and the burst allocated by the MAP.

In step 1200 of FIG. 12, the BS 110 transmits the reference signal to the MS 120 using the plurality of downlink Tx beams.

In step 1202, the MS 120 receives the reference signal from the BS 110 using the plurality of downlink Tx beams. In step 1204, the MS 120 determines the plurality of the candidate downlink Tx beams and the corresponding optimal Rx beams in response to the received reference signal. In step 1206, the MS 120 transmits the information of the determined candidate downlink Tx beams and the information indicating the optimal downlink Rx beams to the BS 110. The number of the candidate downlink Tx beams can be determined to be a value greater than 1 and smaller than or equal to the number of the downlink Tx beams. For example, the indication information includes the information indicating whether all of the candidate downlink Tx beams correspond to the one optimal downlink Rx beam. For example, the indication information is in the bitmap format including the bits corresponding to the candidate downlink Tx beams. The bit includes the information indicating whether the Rx beam corresponding to the candidate downlink Tx beam is the same as the one optimal downlink Rx beam. For example, the indication information includes information indicating the downlink Rx beams corresponding to the candidate downlink Tx beams.

In step 1208, the BS 110 receives the information of the plurality of candidate downlink Tx beams determined by the MS 120 and the information indicating the optimal downlink Rx beams in response to the reference signal reception. In step 1210, the BS 110 selects at least one downlink Tx beam from the candidate downlink Tx beams according to a predefined rule, which is notified to the MS 120 in advance over a broadcasting channel. For example, the predefined rule selects at least one downlink Tx beam from the candidate downlink Tx beams based on the signal strength.

In step 1212, the BS 110 generates the control information including the Tx beam information for the burst transmission. In step 1214, the BS 110 transmits the control information using the selected Tx beam. The number of the selected Tx beams is determined to be a value greater than 1 and smaller than or equal to the number of the candidate downlink Tx beams. For example, the control information can include the MAP information for the burst allocation, at least one Tx beam index for the data burst transmission, and the information for updating the Tx beam information of the previous control information.

In step 1216, the MS 120 receives the control information from the BS 110 using the Rx beam corresponding to the optimal downlink Tx beam of the Tx beams selected according to the predefined rule from the candidate downlink Tx beams. In step 1218, the MS 120 extracts the Tx beam information used for the data burst transmission, from the control information. In step 1220, the MS 120 determines the Rx beam based on the extracted Tx beam information.

In step 1222, the BS 110 transmits the data burst based on the Tx beam information included in the control information.

In step 1224, the MS 120 receives the data burst from the BS 110 using the determined Rx beam.

Figure 13:
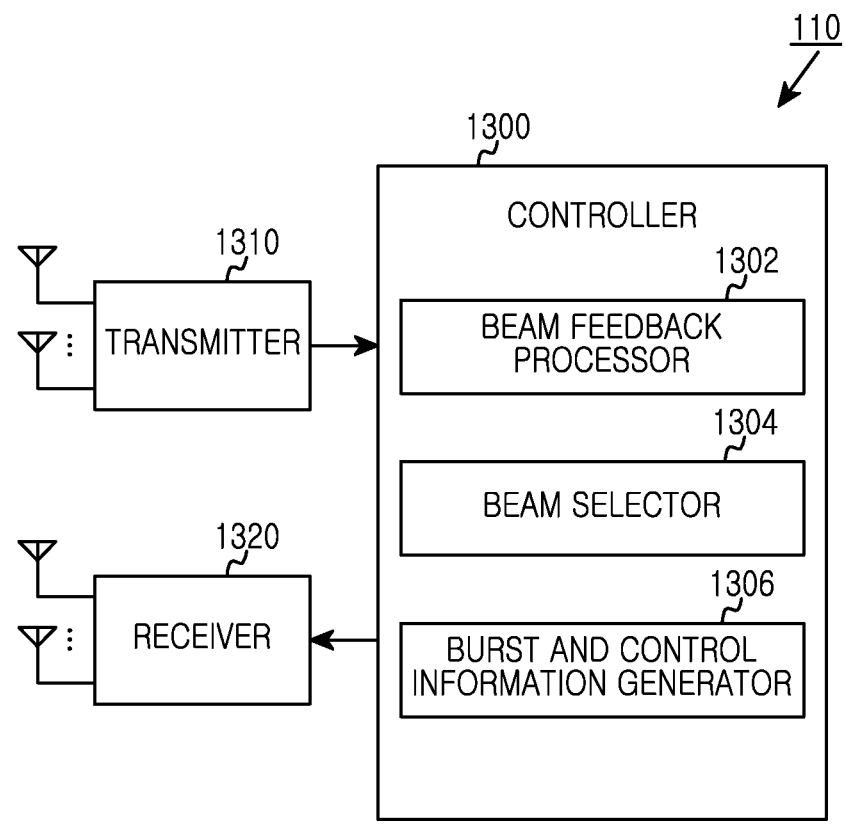
FIG. 13 is a diagram illustrating a BS apparatus for a beam allocation according to an exemplary embodiment of the present invention.
Figure 14:
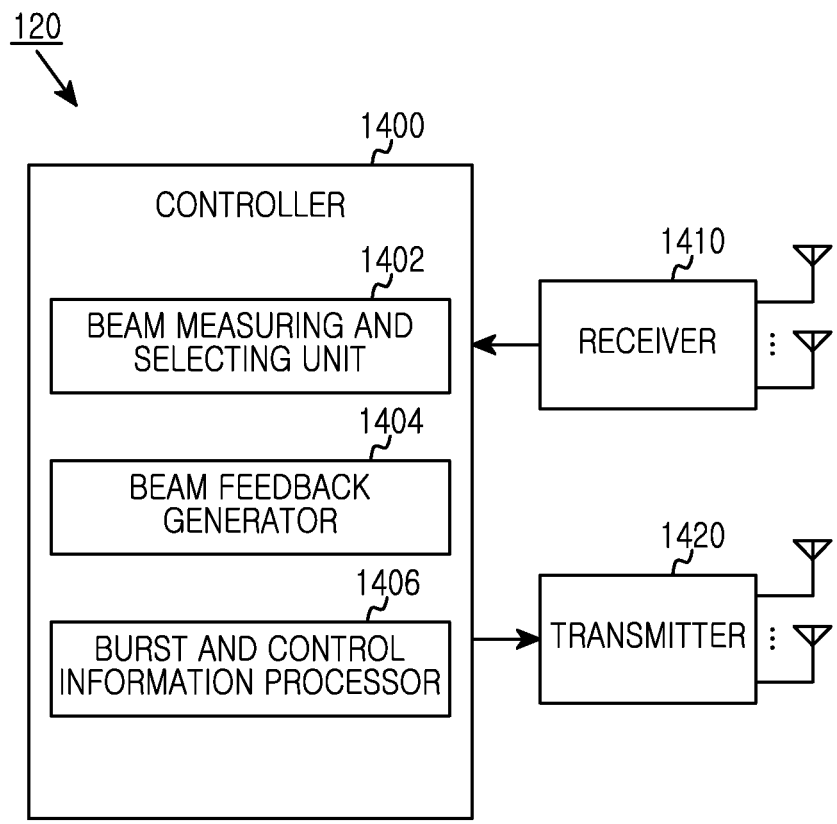
FIG. 14 is a diagram illustrating an MS apparatus for a beam allocation according to an exemplary embodiment of the present invention.

FIG. 13 is a diagram illustrating a BS apparatus for a beam allocation according to an exemplary embodiment of the present invention, and FIG. 14 is a diagram illustrating an MS apparatus for a beam allocation according to an exemplary embodiment of the present invention.

Referring to FIGS. 13 and 14, the MS 120 includes a controller 1400, a receiver 1410, and a transmitter 1420. Similarly, the BS 110 includes a controller 1300, a receiver 1320, and a transmitter 1310.

The receivers 1320 and 1410 process an RF signal received over multiple antennas into a baseband signal.

For example, according to Orthogonal Frequency Division Multiplexing (OFDM), the receivers 1320 and 1410 convert an analog signal to sample data, convert the sample data to frequency-domain data using Fast Fourier Transform (FFT), and select and output data of subcarriers to receive from the frequency-domain data. The receivers 1320 and 1410 demodulate and decode the data according to a preset modulation level (i.e., Modulation and Coding Scheme (MCS) level) and provide the demodulated and decoded data to the controllers 1300 and 1400. For example, according to Code Division Multiple Access (CDMA), the receivers 1320 and 1410 can channel-decode and spread the data.

The transmitters 1310 and 1420 convert the baseband signal to the RF signal and transmit the RF signal. For example, the transmitters 1310 and 1420 encode and modulate data fed from the controllers 1300 and 1400 according to the preset modulation level (i.e., MCS level). The transmitters 1310 and 1420 output the sample data (i.e., OFDM symbols) by applying Inverse FFT (IFFT) to the modulated symbols, convert the sample data to the analog signal, convert the analog signal to the RF signal, and transmit the RF signal over an antenna. For example, the transmitters 1310 and 1420 can channel-code and spread the data to transmit.

As constructed above, the controllers 1300 and 1400 are protocol controllers, the controller 1400 controls the operations of the MS 120, and the controller 1300 controls the operations of the BS 110. The controllers 1300 and 1400 receive information from a corresponding component of a physical layer during the protocol processing, or issue a control signal to the corresponding component of the physical layer.

The controllers 1300 and 1400 control the MS 120 and the BS 110 for the beam allocation as shown in FIGS. 2 through 12.

Referring to FIG. 13, the controller 1300 of the BS 110 includes a beam feedback processor 1302, a beam selector 1304, and a burst and control information generator 1306.

The beam feedback processor 1302 processes the received information of the plurality of candidate downlink Tx beams determined by the MS 120, in response to the reference signal received using the plurality of downlink Tx beams. For example, the beam feedback processor 1302 processes the received information of the plurality of candidate downlink Tx beams determined by the MS 120 and the received information indicating the optimal downlink Rx beams, in response to the reference signal received using the plurality of downlink Tx beams.

The beam selector 1304 selects at least one downlink Tx beam from the candidate downlink Tx beams according to the predefined rule, which is notified to the MS 120 in advance over the broadcasting channel. For example, the predefined rule selects at least one downlink Tx beam from the candidate downlink Tx beams based on the signal strength. The number of the selected Tx beams is determined to be a value greater than 1 and smaller than or equal to the number of the candidate downlink Tx beams.

The burst and control information generator 1306 generates the control information including the Tx beam information for the burst transmission. For example, the control information can include the MAP information for the burst allocation, at least one Tx beam index for the data burst transmission, and the information for updating the Tx beam information of the previous control information. The burst and control information generator 1306 also generates the data burst based on the Tx beam information of the control information.

Referring to FIG. 14, the controller 1400 of the MS 120 includes a beam measuring and selecting unit 1402, a beam feedback generator 1404, and a burst and control information processor 1406.

The beam measuring and selecting unit 1402 selects the plurality of the candidate downlink Tx beams in response to the reference signal received from the BS 110 over the candidate downlink Tx beams. For example, the beam measuring and selecting unit 1402 selects the plurality of the candidate downlink Tx beams and the corresponding optimal Rx beams in response to the reference signal received from the BS 110 using the candidate downlink Tx beams.

The beam feedback generator 1404 generates the information of the determined candidate downlink Tx beams. For example, the beam feedback generator 1404 generates the information of the determined candidate downlink Tx beams and the information indicating the optimal downlink Rx beams. The number of the candidate downlink Tx beams can be determined to be a value greater than 1 and smaller than or equal to the number of the downlink Tx beams. For example, the indication information includes the information indicating whether all of the candidate downlink Tx beams correspond to the one optimal downlink Rx beam. For example, the indication information is in the bitmap format including the bits corresponding to the candidate downlink Tx beams. The bit includes the information indicating whether the Rx beam corresponding to the candidate downlink Tx beam is the same as the one optimal downlink Rx beam. For example, the indication information includes the information indicating the downlink Rx beams corresponding to the candidate downlink Tx beams.

The burst and control information processor 1406 processes the control information received from the BS 110 using the Rx beam corresponding to the optimal downlink Tx beam of the Tx beams selected according to the predefined rule from the candidate downlink Tx beams. The burst and control information processor 1406 extracts the Tx beam information used for the data burst transmission, from the control information and determines the Rx beam based on the extracted Tx beam information. The burst and MAP processor 1406 processes the data burst received from the BS 110 using the determined Rx beam.

For example, with respect to exemplary embodiments of FIGS. 2 and 3, the controller 1300 of the BS 110 repeatedly transmits the downlink reference signal, receives the P candidate downlink Tx beam information from the MS 120, and selects one optimal Tx beam from the candidate downlink Tx beams. For example, the BS 110 selects the optimal Tx beam, for example, the Tx beam of the greatest RSSI, CINR, or SIR of the reference signal among the P Tx beams fed back from the MS 120. The controller 1300 transmits the MAP information for the burst allocation to the MS 120 using the selected Tx beam pattern.

In various exemplary implementations, when the MS does not provide the corresponding optimal Rx beam information as feeding the P candidate downlink Tx beam information back, the BS selects the optimal Tx beam.

In various exemplary implementations, when the MS feeds the P downlink optimal Tx beam information back to the BS, the 1-bit information indicates whether all of the P candidate downlink Tx beams correspond to the single downlink optimal Rx beam, or each bit of the bitmap indicates whether the optimal Rx beam corresponding to the corresponding downlink optimal Tx beam fed back is the same as the optimal Rx beam corresponding to the optimal downlink Tx beam. Alternatively, the index information of all of the optimal Tx beams corresponding to the candidate downlink Tx beams fed back can be provided.

According to an exemplary embodiment of the present invention, the controller 1400 of the MS 120 receives the reference signal over the N particular Tx beams, and selects the P candidate Tx and Rx beams based on the RSSI, the CINR, or the SIR of the received reference signal exceeding the particular threshold. In various exemplary implementations, the controller 1400 can arrange the Tx/Rx beam pairs based on the RSSI, the CINR, or the SIR of the reference signal, and select the Tx/Rx beam pairs as many as a predefined number. The controller 1400 transmits the selected P Tx/Rx beam pairs or Tx beam information to the BS 110. In various exemplary implementations, the controller 1400 can transmit the P candidate downlink Tx beam information together with the indication information indicating whether all of the P candidate downlink Tx beams correspond to the single downlink Rx beam, the information indicating whether the optimal Rx beam corresponding to the optimal Tx beam is the same as the Rx beam corresponding to the optimal downlink Tx beam, or the optimal Rx beam index information corresponding to the candidate downlink Tx beam fed back.

For example, with respect to exemplary embodiments of FIGS. 4 and 5, the controller 1300 of the BS 110 selects at least one Tx beam for the burst transmission from the P Tx beams, generates the control information (e.g., MAP) including the at least one Tx beam information for the burst transmission, and transmits the MAP information using the corresponding Tx beam information. In various exemplary implementations, the control information can include the information for updating the previous Tx beam information. For example, the control information can include Tx beam add, Tx beam delete, Tx beam change, or none (e.g., no Tx beam index information) with respect to the Tx beam used in the previous burst transmission.

The controller 1300 determines whether it is time to transmit the burst allocated to the MAP information, and transmits the data burst based on the Tx beam information of the control information. The Tx beam information in the control information can be the Tx beam index selected for the burst transmission based on the P Tx beams, or the Tx beam index for updating the previous Tx beam information using the following functions.

According to another exemplary embodiment of the present invention, the controller 1400 of the MS 120 receives the control information (e.g., MAP) for the burst allocation based on the previous Rx beam information, extracts the Tx beam index information for the burst transmission from the control information, determines the Tx beam for the burst transmission, and identifies the Rx beam corresponding to the determined Tx beam. For example, the controller 1400 can identify the Rx beam corresponding to the Tx beam based on the Tx/Rx beam pair. The controller 1400 receives the burst data at the burst transmission time using the determined Rx beam.

As set forth above, the exemplary method for effectively allocating the Tx beam transmits all the multiple beams together or selects the beams in the wireless communication system, thereby providing gains, such as beam diversity and beam scheduling flexibility. While the downlink beam allocation is exemplified, exemplary embodiments of the present invention are applicable to the uplink beam allocation.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a base station in a wireless communication system, the method comprising:

transmitting a reference signal to a terminal using a plurality of transmission beams;
receiving information of at least one of a plurality of candidate transmission beams from the terminal;
generating control information including information regarding a first transmission beam for transmitting data;
transmitting the control information using a second transmission beam; and
transmitting the data using the first transmission beam.

2. The method of claim 1, further comprising:
selecting at least one transmission beam from among the plurality of transmission beams based on the information of the at least one candidate transmission beam,
wherein the at least one transmission beam includes the first transmission beam and the second transmission beam.

3. The method of claim 2, wherein the plurality of candidate transmission beams is selected by the terminal from among the plurality of transmission beams based on a received signal strength of the reference signal.

4. The method of claim 3, wherein the received signal strength of the reference signal transmitted using the plurality of candidate transmission beams is greater than a predefined threshold.

5. The method of claim 4, wherein the selecting of the at least one transmission beam from among the plurality of transmission beams comprises:
selecting, based on the information of the at least one candidate transmission beam, one transmission beam from among the plurality of transmission beams as the second transmission beam; and
selecting, based on the information of the at least one candidate transmission beam, another transmission beam from among the plurality of transmission beams as the first transmission beam,
wherein the received signal strength of the reference signal transmitted using the one transmission beam has the greatest received signal strength.

6. The method of claim 4, wherein the selecting of the at least one transmission beam from among the plurality of transmission beams comprises:
selecting, based on the information of the at least one candidate transmission beam, one transmission beam from among the plurality of transmission beams as the first transmission beam and the second transmission beam,
wherein the received signal strength of the reference signal transmitted using the one transmission beam has the greatest received signal strength.

7. The method of claim 4, wherein the selecting of the at least one transmission beam from among the plurality of transmission beams comprises:
selecting, based on the information of the at least one candidate transmission beam, one transmission beam from among the plurality of transmission beams as the second transmission beam; and
selecting, based on the information of the at least one candidate transmission beam, another transmission beam from among the plurality of transmission beams as the first transmission beam.

8. The method of claim 1, wherein the control information comprises a beam index for the first transmission beam.

9. The method of claim 1, wherein the control information comprises information for updating previously transmitted control information.

10. The method of claim 1, wherein the control information further comprises resource allocation information for data transmission.

11. The method of claim 1, further comprising:
receiving indication information, which indicates one or more reception beams of the terminal corresponding to the at least one candidate transmission beam.

12. The method of claim 11, wherein the indication information comprises information indicating whether any of the at least one candidate transmission beam corresponds to an optimal reception beam.

13. The method of claim 11, wherein the indication information is in a bitmap format comprising bits corresponding to the at least one candidate transmission beam, wherein each bit comprises information indicating whether a reception beam corresponding to a respective candidate transmission beam is an optimal reception beam.

14. A method for operating a terminal in a wireless communication system, the method comprising:
receiving a reference signal, from a base station, transmitted using a plurality of transmission beams;
transmitting information of at least one of the plurality of candidate transmission beams to the base station;
receiving control information from the base station; and
receiving data from the base station,
wherein the control information includes information regarding a first transmission beam for transmitting the data by the base station,
wherein the control information is transmitted from the base station using a second transmission beam, and
wherein the data is transmitted from the base station using the first transmission beam.

15. The method of claim 14, wherein the at least one transmission beam is selected by the base station from among the plurality of transmission beams based on the information of the at least one candidate transmission beam, and
wherein the at least one transmission beam includes the first transmission beam and the second transmission beam.

16. The method of claim 15, further comprising:
selecting the plurality of candidate transmission beams from among the plurality of transmission beams based on a received signal strength of the reference signal.

17. The method of claim 16, wherein the received signal strength of the reference signal transmitted using the plurality of candidate transmission beams is greater than a predefined threshold.

18. The method of claim 17, wherein one transmission beam is selected by the base station from among the plurality of transmission beams as the second transmission beam, and another transmission beam is selected by the base station from among the plurality of transmission beams as the first transmission beam, based on the information of the at least one candidate transmission beam, and
wherein the received signal strength of the reference signal transmitted using the one transmission beam has the greatest received signal strength.

19. The method of claim 17, wherein one transmission beam is selected by the base station from among the plurality of transmission beams as the first transmission beam and the second transmission beam, based on the information of the at least one candidate transmission beam, and
wherein the received signal strength of the reference signal transmitted using the one transmission beam has the greatest received signal strength.

20. The method of claim 17, wherein one transmission beam is selected by the base station from among the plurality of transmission beams as the second transmission beam, and another transmission beam is selected by the base station from among the plurality of transmission beams as the first transmission beam, based on the information of the at least one candidate transmission beam.

21. The method of claim 14, wherein the control information comprises a beam index for the first transmission beam.

22. The method of claim 14, wherein the control information comprises information for updating previously transmitted control information.

23. The method of claim 14, wherein the control information further comprises resource allocation information for data transmission.

24. The method of claim 14, further comprising:
transmitting indication information, which indicates one or more reception beams of the terminal corresponding to the at least one candidate transmission beam.

25. The method of claim 24, wherein the indication information comprises information indicating whether any of the at least one candidate transmission beam corresponds to an optimal reception beam.

26. The method of claim 24, wherein the indication information is in a bitmap format comprising bits corresponding to the at least one candidate transmission beam, and wherein each bit comprises information indicating whether a reception beam corresponding to a respective candidate transmission beam is an optimal reception beam.

27. An apparatus of a base station in a wireless communication system, the apparatus comprising:
a transmitter;
a receiver; and
a controller,
wherein the transmitter is configured to transmit a reference signal to a terminal using a plurality of transmission beams,
wherein the receiver is configured to receive information of at least one of a plurality of candidate transmission beams from the terminal,
wherein the controller is configured to generate control information including information regarding a first transmission beam for transmitting data, and
wherein the transmitter is configured to transmit the control information using a second transmission beam, and to transmit the data using the first transmission beam.

28. The apparatus of claim 27, wherein the controller is further configured to select at least one transmission beam from among the plurality of transmission beams based on the information of the at least one candidate transmission beam, and
wherein the at least one transmission beam includes the first transmission beam and the second transmission beam.

29. The apparatus of claim 28, wherein the plurality of candidate transmission beams is selected by the terminal from among the plurality of transmission beams based on a received signal strength of the reference signal.

30. The apparatus of claim 29, wherein the received signal strength of the reference signal transmitted using the plurality of candidate transmission beams is greater than a predefined threshold.

31. The apparatus of claim 30, wherein the controller is further configured:
to select, based on the information of the at least one candidate transmission beam, one transmission beam from among the plurality of transmission beams as the second transmission beam; and to select, based on the information of the at least one candidate transmission beam, another transmission beam from among the plurality of transmission beams as the first transmission beam, wherein the received signal strength of the reference signal transmitted using the one transmission beam has the greatest received signal strength.

32. The apparatus of claim 30, wherein the controller is further configured to select, based on the information of the at least one candidate transmission beam, one transmission beam from among the plurality of transmission beams as the first transmission beam and the second transmission beam, and wherein the received signal strength of the reference signal transmitted using the one transmission beam has the greatest received signal strength.

33. The apparatus of claim 30, wherein the controller is further configured:

to select, based on the information of the at least one candidate transmission beam, one transmission beam from among the plurality of transmission beams as the second transmission beam; and to select, based on the information of the at least one candidate transmission beam, another transmission beam from among the plurality of transmission beams as the first transmission beam.

34. The apparatus of claim 27, wherein the control information comprises a beam index for the first transmission beam.

35. The apparatus of claim 27, wherein the control information comprises information for updating previously transmitted control information.

36. The apparatus of claim 27, wherein the control information further comprises resource allocation information for data transmission.

37. The apparatus of claim 27, wherein the receiver is further configured to receive indication information, which indicates one or more reception beams of the terminal corresponding to the at least one candidate transmission beam.

38. The apparatus of claim 37, wherein the indication information comprises information indicating whether any of the at least one candidate transmission beam corresponds to an optimal reception beam.

39. The apparatus of claim 37, wherein the indication information is in a bitmap format comprising bits corresponding to the at least one candidate transmission beam, and wherein each bit comprises information indicating whether a reception beam corresponding to a respective candidate transmission beam is an optimal reception beam.

40. An apparatus of a terminal in a wireless communication system, the apparatus comprising:

a receiver; and a transmitter, wherein the receiver is configured to receive a reference signal, from a base station, transmitted using a plurality of transmission beams, wherein the transmitter is configured to transmit information of at least one of the plurality of candidate transmission beams to the base station, wherein the receiver is configured to receive control information from the base station and receive a data from the base station, wherein the control information includes information regarding a first transmission beam for transmitting the data by the base station, wherein the control information is transmitted from the base station using a second transmission beam, and wherein the data is transmitted from the base station using the first transmission beam.

41. The apparatus of claim 40, wherein the at least one transmission beam is selected by the base station from among the plurality of transmission beams based on the information of the at least one candidate transmission beam, and wherein the at least one transmission beam includes the first transmission beam and the second transmission beam.

42. The apparatus of claim 41, further comprising:

a controller configured to select the plurality of candidate transmission beams from among the plurality of transmission beams based on a received signal strength of the reference signal.

43. The apparatus of claim 42, wherein the received signal strength of the reference signal transmitted using the plurality of candidate transmission beams is greater than a predefined threshold.

44. The apparatus of claim 43, wherein one transmission beam is selected by the base station from among the plurality of transmission beams as the second transmission beam, and another transmission beam is selected by the base station from among the plurality of transmission beams as the first transmission beam, based on the information of the at least one candidate transmission beam, and wherein the received signal strength of the reference signal transmitted using the one transmission beam has the greatest received signal strength.

45. The apparatus of claim 43, wherein one transmission beam is selected by the base station from among the plurality of transmission beams as the first transmission beam and the second transmission beam, based on the information of the at least one candidate transmission beam, and wherein the received signal strength of the reference signal transmitted using the one transmission beam has the greatest received signal strength.

46. The apparatus of claim 43, wherein one transmission beam is selected by the base station from among the plurality of transmission beams as the second transmission beam, and another transmission beam is selected by the base station from among the plurality of transmission beams as the first transmission beam, based on the information of the at least one candidate transmission beam.

47. The apparatus of claim 40, wherein the control information comprises a beam index for the first transmission beam.

48. The apparatus of claim 40, wherein the control information comprises information for updating previously transmitted control information.

49. The apparatus of claim 40, wherein the control information further comprises resource allocation information for data transmission.

50. The apparatus of claim 40, wherein the transmitter is further configured to transmit indication information, which indicates one or more reception beams of the terminal corresponding to the at least one candidate transmission beam.

51. The apparatus of claim 50, wherein the indication information comprises information indicating whether any of the at least one candidate transmission beam corresponds to an optimal reception beam.

52. The apparatus of claim 50, wherein the indication information is in a bitmap format comprising bits corresponding to the at least one candidate transmission beam, and wherein each bit comprises information indicating whether a reception beam corresponding to a respective candidate transmission beam is an optimal reception beam.

* * * * *